Figures 7, 8:
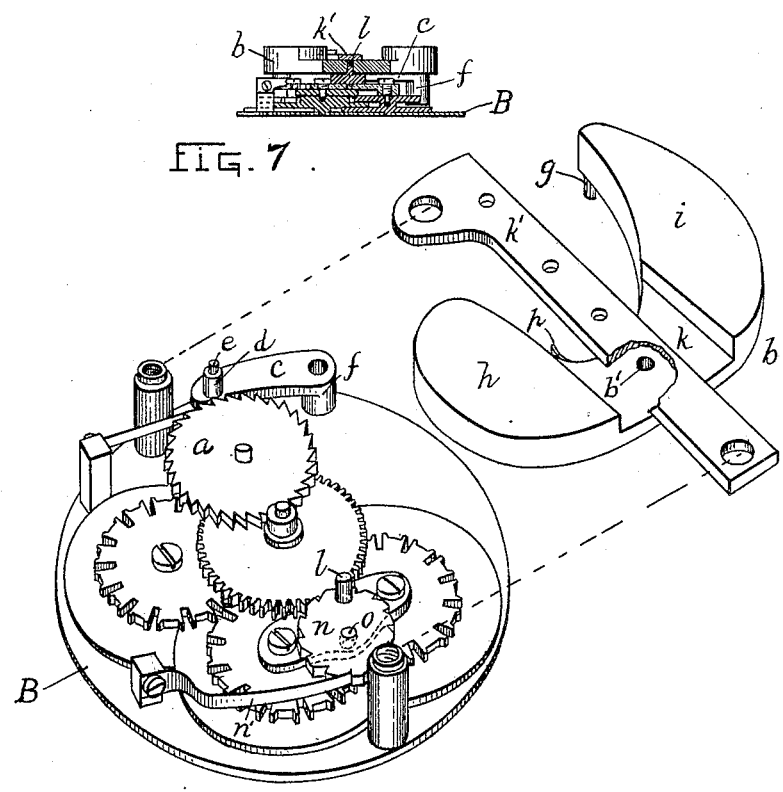

(No Model.) 2 Sheets—Sheet 1.
J. BUTCHER.
CYCLOMETER.
No. 522,965. Patented July 17, 1894.
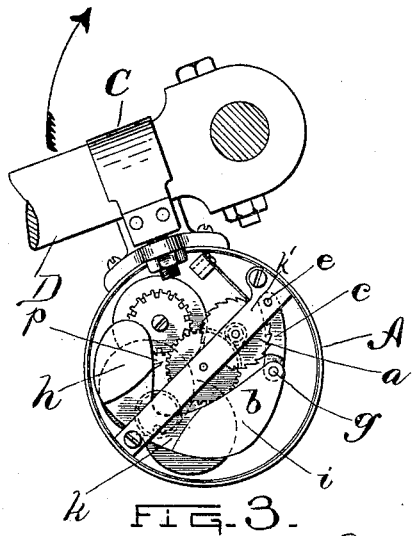
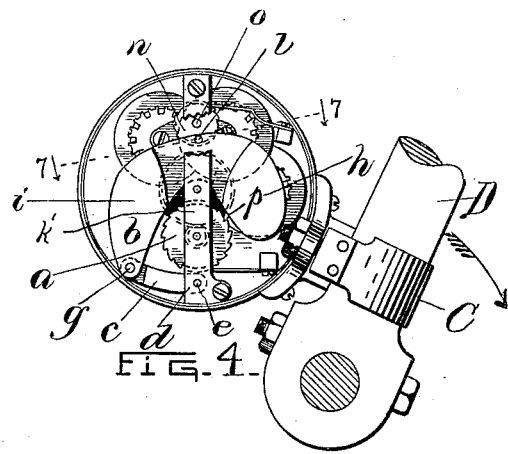
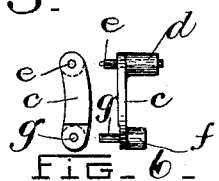
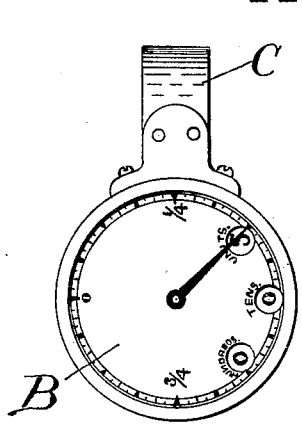
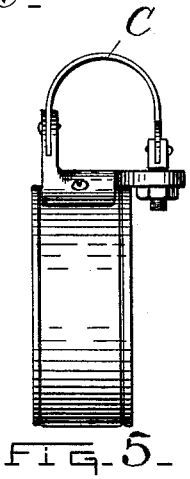
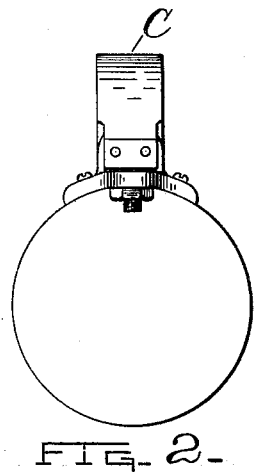
Witnesses:
George G. Beals
William McDanald
Inventor:
Joseph Butcher,
By M. F. Stevens,
Atty (No Model.) 2 Sheets—Sheet 2.
J. BUTCHER.
CYCLOMETER.

No. 522,965. Patented July 17, 1894.

Witnesses: Inventor:
U. B. Hillyard. Joseph Butcher,
A. W. Harrison By Milan F. Stevens,
Atty.

UNITED STATES PATENT OFFICE.

JOSEPH BUTCHER, OF MELROSE, MASSACHUSETTS.

CYCLOMETER.

SPECIFICATION forming part of Letters Patent No. 522,965, dated July 17, 1894.

Application filed June 23, 1893. Serial No. 478,576. (No model.)

*To all whom it may concern:*

Be it known that I, JOSEPH BUTCHER, a citizen of the United States, and a resident of Melrose, in the county of Middlesex and State of Massachusetts, have invented certain new and useful Improvements in Cyclometers, of which the following is a specification.

My invention relates to that class of devices commonly called cyclometers and odometers which are mounted on and are carried around by the wheel or other rotating part of a vehicle and the registering mechanisms of which are actuated by the force of gravity operating to shift some moving part usually arranged within the cyclometer case, as the wheel or other rotating part revolves. In all cyclometers of this class so far as I am aware, a pendent weight is attached which is of little utility and adds an undesirable weight to the cyclometer.

The object of my present invention is to dispense with the pendent weight and to place the cyclometer on the wheel or other rotating part of a vehicle, so that it shall be actuated intermittently by the movement of the wheel or other rotating part one or more times during each rotation of one of the wheels or other rotating parts of the vehicle.

My invention will be fully described hereinafter and its novel features carefully defined in the claims. In the drawings which serve to illustrate my invention, I have for convenience shown its novel features embodied in a bicycle crank cyclometer having registering mechanism substantially identical with that illustrated in Letters Patent No. 356,822, dated February 1, 1887.

Figure 1 is a front view of the cyclometer showing the dial and clamp for attachment to the crank. Fig. 2 is a rear view showing the clamp for attachment to the crank. These are merely exterior views. Fig. 3 is a back or rear view of the internal mechanism of the cyclometer. This view shows the cyclometer as it stands when the crank to which it is secured stands nearly horizontal. Fig. 4 is a similar view to Fig. 3 but showing the position of the cyclometer when the crank to which it is attached stands nearly vertical. Fig. 5 is a side view of the cyclometer. Fig. 6 represents, in detail, plan and side views of the weight supporting link. Fig. 7 is a section on line 7—7 of Fig. 4, looking in the direction of the arrows, the mechanism being removed from the case. Fig. 8 is a perspective view of the mechanism enlarged, some of the parts being separated from the others.

For convenience I prefer to inclose the registering mechanism in a circular sheet metal case and this case I close hermetically. The dial construction, units, tens and hundreds, disks, ratchets and train of gearing are in substance the same as those described in my Letters Patent before mentioned and need no particular description. In fact the registering mechanism may be constructed in any way so long as it is capable of being actuated intermittently by a pawl and ratchet movement.

The novel features of my present invention relate to the means for imparting a rotary-oscillatory motion to the leading or driving wheel of the registering mechanism and this wheel may be made to impart its movement to said mechanism in any of the well known ways.

A represents the case of the cyclometer; B, the dial plate; C, a clamp of any kind for attaching the cyclometer to a crank D—in this case supposed to be the crank of a bicycle.

Referring now to Figs. 3 and 4, $a$, is a driving wheel of the registering mechanism which in this case is a ratchet wheel. This wheel may impart its movement to the indicator of the cyclometer by any suitable mechanism. My object is to impart an intermittent forward motion to this wheel and I will now describe the means I employ for effecting this object.

$b$, is a weight having a link $c$ connected to one end to support and guide it in its operative movements, as will presently appear. This link $c$ has a sleeve $d$ at one end loosely mounted on a pin $e$ supported by the dial and frame bar $k'$, and at the other end has a sleeve or bearing $f$ to receive a pin $g$ connecting it with the weight, as shown. Said weight $b$ is of an irregular form, consisting of two parts $h$ and $i$ connected by a reduced portion $k$, and it is held in position by the frame bar $k'$ of the mechanism passing across said reduced portion, and is provided with a bearing $b'$ in the center of said reduced portion to receive a crank pin $l$, and said crank pin $l$ is connected with ratchet wheel $n$, mounted freely on pin $o$, connected with the frame work of the mechanism and having a spring detent $n'$. Suppose the crank D, to which the cyclometer is attached to be revolving in the direction of arrow $x$, in Figs. 3 and 4; when it reaches a nearly horizontal position, as shown in Fig. 3, the weight $b$, will be at the extreme lowest position in its case, but as it continues to revolve until it reaches a nearly vertical position, as shown in Fig. 4 the action of gravity on the weight $b$, will cause it to seek the position shown in Fig. 4, and will bring the eye-piece or pawl $p$, into engagement with the ratchet wheel $a$. In making this movement, it will be seen that when the weight $b$, moves under the impulse of gravity, it is limited in its movement laterally and vertically by the action of the crank-pin $l$ working in bearing in reduced portion $k$, and attached to the wheel $n$, mounted on the frame work of the mechanism and that said weight $b$, will impart one impulse to the ratchet wheel $a$, by means of the eye-piece or pawl $p$, projecting from said weight. Each revolution of the crank D, imparts one forward impulse to the wheel $a$.

The link and sleeve connection described permits the weight to have the necessary movement on the crank pin $l$, the weight being prevented from rotating on an axis relatively to the case. The pin $l$ on the wheel $n$ is for the purpose solely of guiding the weight so that the pawl $p$ will describe an orbital path and make contact with the ratchet wheel $a$ once during each orbital movement described by that portion of the weight to which the pawl $p$ is attached.

An important feature of my invention resides in the rotary-oscillatory weight $b$, by which initial movement is imparted to the train of gearing which actuates the indicator of the cyclometer.

I do not wish to limit myself to the mechanism shown, as the intermediary between the oscillating and rotating weight and the wheel $a$, as this may be varied almost indefinitely without departing from the true spirit of my invention. I have shown a simple and operative device, but I am aware that the motion of the weight $b$, may be communicated to the wheel $a$, in various ways.

Having thus described my invention, I claim—

1. A cyclometer comprising in its construction a casing, an indicator, a train of gearing for operating the indicator, a ratchet wheel for imparting movement to said train of gearing, a weight bodily movable within the casing and having a pawl attached thereto, and supporting and guiding devices for the weight of a structural character in virtue of which the pawl is adapted to move in an orbital path adjacent to the ratchet wheel and engage it once during each complete movement of the weight relatively to the casing, substantially as described.

2. A cyclometer comprising arbor $e$, link $c$, sleeves $d$ and $f$, crank-pin $l$, ratchet wheel $n$, pin $o$ and an actuating weight, substantially as and for the purposes set forth.

3. The combination, with the registering mechanism of a cyclometer having a driving ratchet wheel $a$, of a ratchet wheel $n$ mounted on pin $o$ and having pin $l$, an actuating weight $b$ having pawl $p$ and connected by a link $c$ and sleeve $d$, with an arbor $e$ attached to the frame work of said registering mechanism, said link and sleeve, crank-pin, ratchet wheel and pin guiding and limiting the movement of said weight whereby the movements of said weight are communicated to said pawl.

4. The combination with the crank or other rotating part of a vehicle, of a registering mechanism adapted to operate intermittently and an actuating weight connected, at one end, by a crank-lever and sleeve with an arbor connected with the frame work of said mechanism, and connected, at another end, by a crank-pin and a ratchet wheel pinioned to the frame work of said mechanism, as set forth.

In testimony whereof I have signed my name to this specification, in the presence of two subscribing witnesses, on this 12th day of June, A. D. 1893.

JOSEPH BUTCHER.

Witnesses:
 W. S. SOULE,
 F. W. MARSHALL.